United States Patent [19]
Laue

[11] Patent Number: 5,469,761
[45] Date of Patent: Nov. 28, 1995

[54] PUSH ROD BUTTON AND METHOD OF MAKING SAME

[75] Inventor: Charles E. Laue, 1335 Luther La., Unit C-7, Bldg. #33, Arlington Heights, Ill. 60004

[73] Assignee: Charles E. Laue, Arlington Heights, Ill.

[21] Appl. No.: 302,056

[22] Filed: Sep. 7, 1994

[51] Int. Cl.$^6$ ................................... B60T 13/52
[52] U.S. Cl. .................. 74/579 R; 91/376 R; 403/345; 29/525
[58] Field of Search ............ 74/579 R; 91/376 R, 91/369.1, 369.2; 403/345, 361; 29/525; 72/334, 348

[56] References Cited

U.S. PATENT DOCUMENTS

| | | | |
|---|---|---|---|
| 4,354,353 | 10/1982 | Laue | 91/369.2 X |
| 4,901,426 | 2/1990 | Laue | |
| 5,024,304 | 6/1991 | Booten et al. | 91/376 R X |
| 5,161,453 | 11/1992 | Yared et al. | 91/376 R |
| 5,350,224 | 9/1994 | Nell et al. | 91/376 R X |

Primary Examiner—Rodney H. Bonck
Assistant Examiner—Mary Ann Battista
Attorney, Agent, or Firm—Hill, Steadman & Simpson

[57] ABSTRACT

A push rod button is made by stamping thin strip stock to form a multiple piece article having interfitted complementary parts, thereby producing a unitary integrated composite which is strong enough to withstand the forces generated in the power train of an automotive braking system.

10 Claims, 3 Drawing Sheets

PUSH ROD BUTTON AND METHOD OF MAKING SAME

BACKGROUND OF THE INVENTION

1. Field of the Invention

This invention relates to generally to the actuation train of an automotive brake assembly and more particularly to an improved push rod button utilized in such a train, and a manufacturing method of making such a push rod button.

2. The Prior Art

The prior art is exemplified by my prior U.S. Pat. No. 4,901,426 issued Feb. 20, 1990 in which there is disclosed a push rod button made and constructed in accordance with the past practice. With such a construction, the work piece is generally selected as a solid piece of metal. The work piece is then subjected to machining operations during which the push rod button is formed into its characteristic configuration. A generally cylindrical cup shaped recess is formed for the purpose of receiving and seating a reaction disc made of rubber, or other suitably elastic and resilient material. Coaxially disposed and extending longitudinally from the bottom wall of the recess in an opposite axial direction, there is provided a reduced diameter cylinder in which is received a shaft part of the push rod constituting one of the elements of the drive train.

Such machining operations are customarily performed on an automatic screw machine. The machine function performed is a precision metal cutting operation, therefor necessitating the time and attention of a skilled machine operator and set-up man, a relatively costly form of manufacturing endeavor. Further, the metal cutting action necessitates the use of an elaborate liquid cooling system in which is circulated a sufficient amount of cutting oil and cutting lubricant so that the handling of the oil or lubricant presents a formidable environmental problem. Lastly, the manufacturing technique generates metal shavings and cuttings as scrap material that must be separated from the lubricant or cutting oil and the disposal of which exacerbates the environmental problems attendant upon producing the product.

SUMMARY OF THE PRESENT INVENTION

The present invention contemplates the utilization of a mass production technique and procedure which will advantageously exploit the characteristics of highly productive automatic machinery without necessitating the intervention of expensive technically skilled personnel.

Thus, a strip-form metal stock is selected which is of sufficient thinness that it will readily be susceptible to one or more single stroke shaping draws with a simple stamping operation. Instead of machining a solid material into a single piece, I propose that there be formed in stamping operations two complementary parts adapted to be nested together and integrated into a unitary double-layered whole, without the necessity of any machining whatsoever with its attendant use of oils and lubricants.

The product thus produced will be totally and completely efficient for its intended functional purpose and will be capable of being produced at greatly reduced cost by less skilled work persons.

DESCRIPTION OF THE PREFERRED EMBODIMENTS

Figure 1:
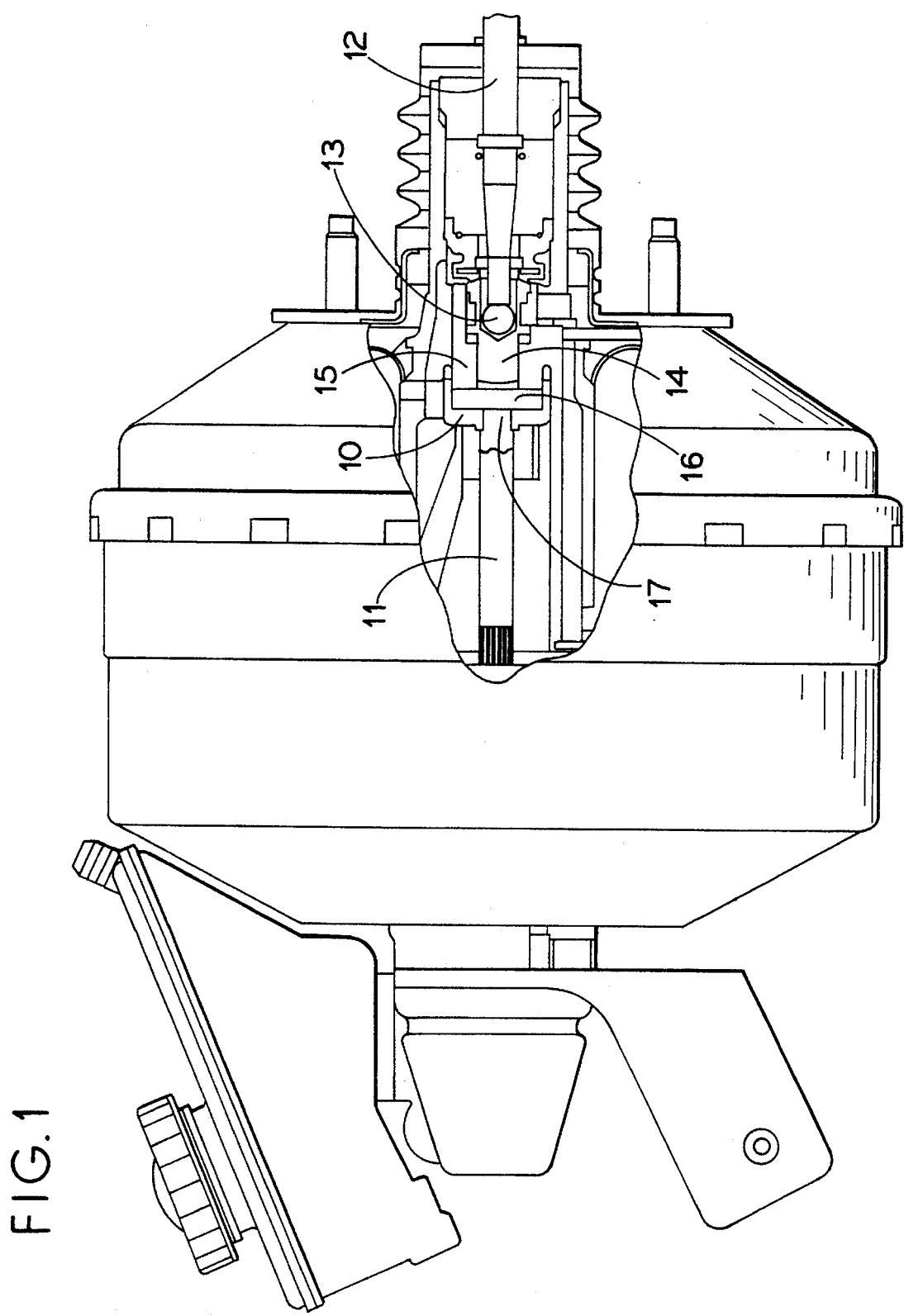
FIG. 1 is a side elevational view with parts broken away and with parts shown in cross section of a so-called tandem recessed series master vac with a recessed cartridge master cylinder and in which there is provided a push rod button in accordance with the principles of the present invention.

Referring to FIG. 1 of the drawings, there is shown an exemplary form of a drive train mechanism of the type generally used in automotive vehicles for the actuation of the braking system. In this illustrative example, the device illustrated is a power booster, more specifically a so-called 205 mm Tandem Recessed Series Master Vac with Recessed Cartridge Master Cylinder. The power booster in the orientation of FIG. 1 has the pedal rod on the right, i.e., the pedal rod which normally attaches to the linkage of the brake pedal, and the push rod extends towards the left.

The particular improvement to which this disclosure is directed is the push rod button shown specifically at the reference numeral 10. To establish the orientation of the button 10 in the remaining environment of the mechanism illustrated, suffice it to explain that the button 10 is engaged in assembly with a push rod shaft 11 extending axially and longitudinally to the left, using the alignment of FIG. 1, and which shaft 11 is part of the drive train between the foot actuated brake pedal engaged by the operator of the vehicle The pedal rod of the drive train is shown at 12 and is provided with a ball 13 seated in the recess of a piston-like element identified at 14. The piston-like element 14 moves within a cylinder 15 and engages against a reaction disc 16 received and seated in the cup-shaped receptacle provided by the button 10.

In the normal functioning of an automotive vehicle in the usual traffic environment of urban driving conditions, it is generally expected that the operator of the vehicle will generate braking forces of 150 to 300 inch pounds which are transmitted through the pedal rod. However, if the operator is required to exert the forces contemplated by a full emergency stop, i.e., if the operator jams on the brake pedal with all of the force a human being can exert with the leg and foot, the momentary surge of force may exceed up to 3000 inch pounds.

With respect to the elements of the drive train and specifically, with respect to the push rod button, it is essential that the walls of the push rod button do not collapse under such a strain. What has been described thus far, can be performed by a conventionally fabricated push rod button machined on an automatic screw machine in a conventional manner.

However, it is a specific object of this invention to improve the push rod button in such a manner that the provision of such part in the drive train will reduce costs, reduce the necessity of using expensive machine operations, and skilled operating personnel in the manufacture thereof, and will completely eliminate the necessity of using cutting oils and lubricants and producing metal shavings and chips during the manufacturing process, while yielding an end product that is strong, safe, simple, and reliable for its intended purpose.

To accomplish those objectives, I have provided a push rod 11 having an elongated shaft part to which is connected at one end thereof the push rod button 10 of the present invention. be safely and efficiently operated by relatively unskilled personnel to produce manufactured machine parts of acceptable tolerances and of good reliability is a stamping machine which has the effect of drawing sheet or strip material into desired shapes and configurations. One of the principal advantages of such a machine is that the drawing operation, if it is not a deep draw such as might be required in drawing a shell casing in the production of armament, is accomplished by a simple thrusting action without the need of lubricants or oils or liquid coolants. A single spray-type lubricant may be applied to the work piece, if desired. In terms of the art of push rod buttons, stamping has not been used or, for that matter, has not even been deemed available heretofore as a viable manufacturing technique because the thickness of a work piece subjected to a simple draw would be limited as a practical matter to a thickness of from about fifty thousandths of an inch or less (0.050"). Such a work piece, if used as the final push rod button product, could never withstand the surge of a full emergency stop force passing through the power train and would be vulnerable to collapse and failure.

I have further discovered that two or more of such stamped drawn work pieces can be effectively combined in a completely automated manufacturing process by simply nesting and pressing the multiple parts together into firm assembly with one another, thereby to produce a single multiple layered integrated element displaying all of the requisite characteristics of strength and performability.

Figure 2:
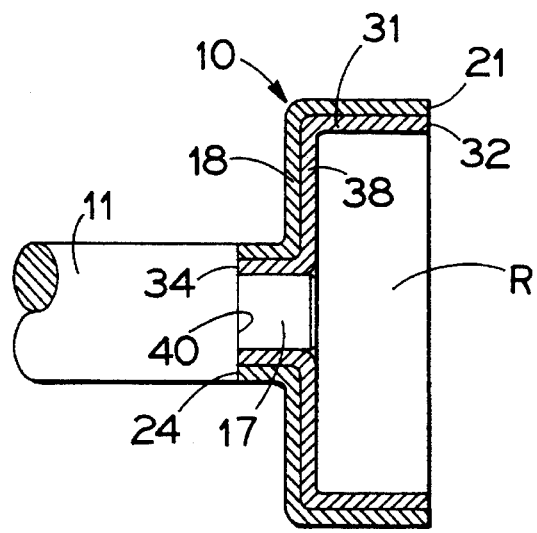
FIG. 2 is an enlarged fragmentary view of the push rod button of the present invention with the push rod shaft in place and depicting a first embodiment or one form of the two-part button as provided in accordance with this invention.

An exemplary embodiment of such discovery is illustrated in FIG. 2 wherein a push rod button 10 made as a sub-assembly of multiple parts is shown press fit together and firmly assembled on the reduced diameter end 17 of the push rod shaft 11.

Figure 3:
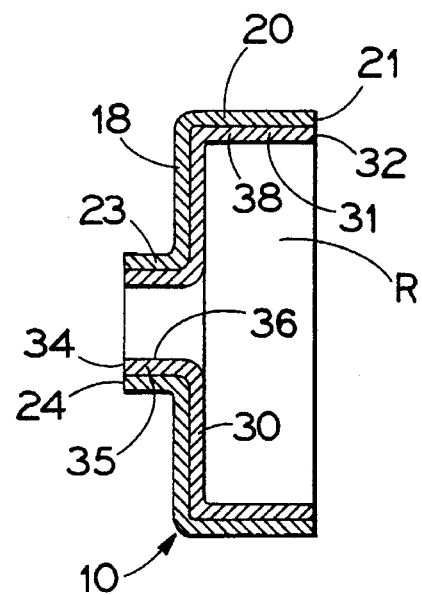
FIG. 3 is a view similar to that of FIG. 2, but showing a cross-sectional view of the sub-assembly forming the two-part button of FIG. 2.

The push rod button 10 thus provided is more particularly illustrated in FIG. 3 wherein it will be noted that the single multiple layered integrated element comprises a first part 18 which is sometimes referred to herein as "stamping A" and a second part 38 which is sometimes referred to herein as "stamping B" the two parts 18 and 38 being press fit into firm assemble with one another to form an integrated unitary button 10.

Figure 4:
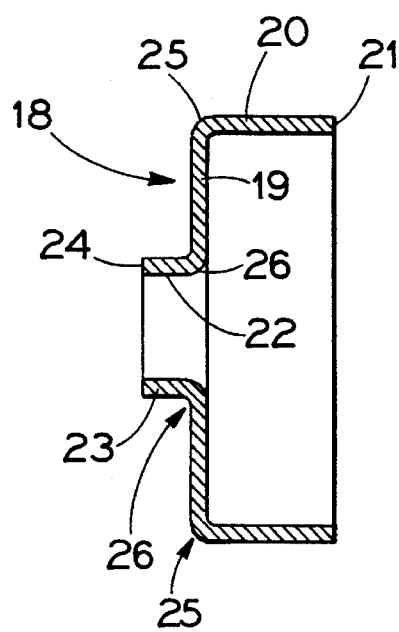
FIG. 4 is a cross-sectional view of stamping A forming one part of the two-part sub-assembly of FIG. 3.

Referring to FIG. 4, the first part 18 is formed from metal strip stock less than 0.050" in thickness and is shaped and configured with one or successively more single stroke draws in a stamping machine operation to the shape and configuration of a generally cylindrical cup shaped work piece article having a bottom wall 19 and a circumferentially extending upright peripheral wall 20 terminating in an end edge 21 which extends longitudinally in one axial direction.

The bottom wall 19 is simultaneously axially and longitudinally pierced and drawn to form an opening prescribing a passageway 22, which extends coaxially and concentrically parallel with the wall 20, but in an opposite longitudinal direction. The passage is thus disposed within a second upright peripheral wall 23 which terminates in an end edge 24. The corners shown at 25 and 26 exhibit a slight radius of curvature in order to facilitate the efficient drawing of the metal by stamping into the shape of the article without out rupture or cracking.

It will be understood that the dimensional sizes of the peripheral walls 20 and 23 are predetermined to coincide with the desired overall size of the button 10 and the outside diameter of the shaft part 17 of the push rod 11.

Figure 5:
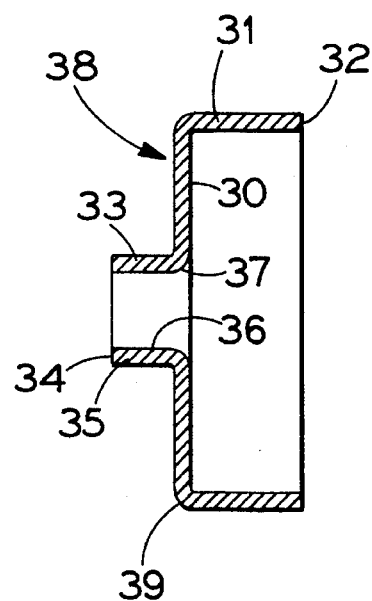
FIG. 5 is a cross-sectional view of stamping B forming the second part of the two- part sub-assembly of FIG. 3.
Figure 6:
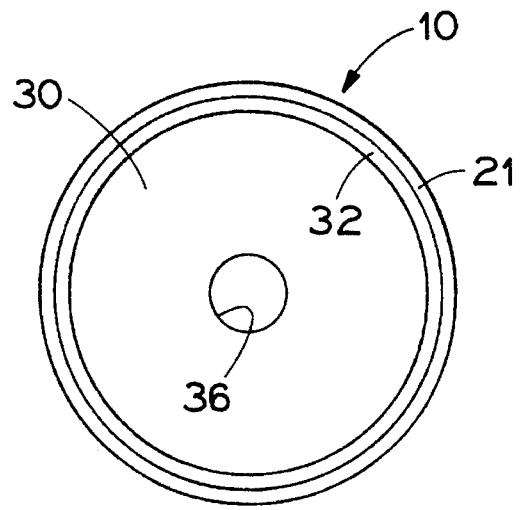
FIG. 6 is an end elevational view of the sub-assembly of FIG. 3.

Referring to FIG. 5, the second part 38 or "stamping B" is made from a strip form stock of less than fifty thousandths of an inch (0.050")in thickness and is shaped and configured by one or sucessively more single stroke draws in a stamping operation in a stamping machine into the work piece article shown in FIG. 5. The work piece article is generally cup shaped and has a bottom wall 30 which is circular and flat and an offset upstanding axially extending peripheral wall is formed at 31 and terminates in an edge 32 and projects away from the wall 30 in one axial direction.

The outside diameter of the wall 31 is selected to be just sufficiently smaller in size than the inner diameter of the wall 20 that the second part 38 and the first part 18 will accommodate a press fit assembly with another in a nested relationship with the first part 18.

The bottom wall 30 is simultaneously shaped and configured by drawing in a stamping operation to form a reduced diameter cylindrical wall 33 terminating in an edge 34. The wall 33 is coaxial with and parallel to the axis of the wall 31, but is of much smaller diameter, the outer diameter surface 35 of the wall 33 being selected to be just enough smaller than the inner diameter of the opening 22 so that the two pads will fit in a good press fit assembly with one another. The inner diameter surface 36 of the wall 33 is selected to have a good press fit relation with the outer diameter of the part 17 of the shaft 11.

In order to facilitate the efficient drawing of the metal work piece during the stamping operation, the corners 37 and 39 between the bottom wall 30 and the walls 31 and 33 are rounded with a radius of curvature.

It will be understood that the outer peripheral walls 20 and 31 when co-joined with one another, together with the bottom wall 19 and the bottom wall 30, similarly co-joined with one another, form a reaction disc recess R for receiving and seating the reaction disc 16, so that the push rod assembly may perform its function in the power train of the braking system.

When so assembled and when so provided in accordance with this invention, the resulting push rod button 10 adequately resists even the stresses and strains of a full emergency stop and fulfills all of the performance requisites of a push rod button, even though it can be manufactured much more economically by manufacturing techniques that lend themselves to mass production with great efficiency and with the use of lesser skilled labor.

In the form of the invention illustrated in FIGS. 2–6, the longitudinal dimension of the peripheral walls 20 and 31 is made to be co-extensive. Therefore, as shown in FIGS. 2 and 3, the edges 21 and 32 are in relative planar registered disposition with respect to one another. The longitudinal dimension of the peripheral wall 23 and 33 are similarly made co-extensive so that the edges 24 and 34 are in co-planar registry with respect to one another.

When assembled by pressing on to the shaft extension 17 of the shaft 11, the edges lie in flat abutting relation to the shoulder 40 formed on the shaft 11 at the end of its reduced diameter portion 17.

Figure 7:
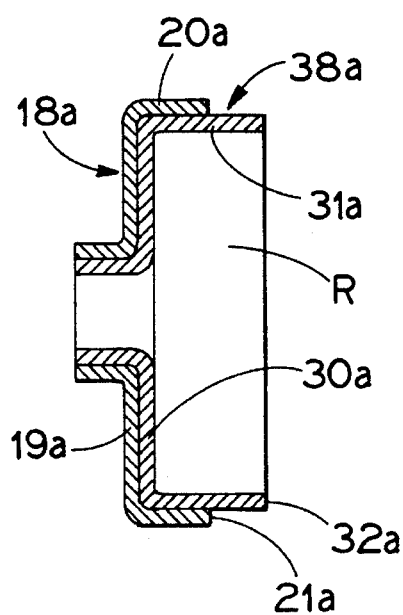
FIG. 7 is a view similar to FIG. 3, but showing a second embodiment which is a variant of the invention of the present disclosure.

In the form of the invention illustrated in FIG. 7, the first and second parts are made in either of the same ways as already described, however, the longitudinal dimension of the outer peripheral walls surrounding the reaction disc recess R is somewhat varied. Thus, it will be noted that a first part is shown at 18a and has an outer peripheral wall 20a while the second part is shown at 38a and has an outer peripheral wall 31a. In this form of the invention, the wall 20a is somewhat shorter than the wall 31a, so that the end edges, shown at 21a and 32a, are not in register with one another. Nevertheless, the outer peripheral wall 31 a together with the conjoined bottom walls shown at 19a and 30a again form a reaction disc recess R for receiving and seating the reaction disc 16.

The longitudinal extent of the outer peripheral wall 20a is sufficient so that the stresses and strains transmitted through the power train are adequately handled without risk of collapse or rupture of the first and second parts 18a and 38a.

Figure 8:
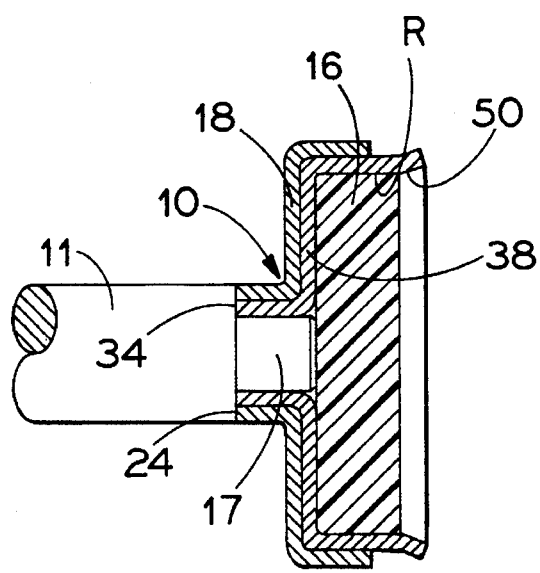
FIG. 8 is a fragmentary cross-sectional view showing details of a manufacturing variation for achieving ease in parts assembly.

In order to enhance the reception and seating of the reaction disc 16 into the reaction disc recess R, the leading edge of the outer peripheral walls 20 and 31 or 31a of the push rod button 10, may be slightly flared to provide a piloting or guiding flange 50, for example, at an angle of approximately ten (10) degrees as shown in FIG. 8. By such provision, the assembly of the reaction disc 16 into th recess R may be made somewhat more convenient.

While I have described the use of two nested together parts, it will be understood by those skilled in the art that I can apply the principles of the present invention to any sub-assembly having at least two parts.

Although other minor modifications might be suggested by those versed in the art, it should be understood that I wish to embody within the scope of the patent warranted hereon all such modifications as reasonably and properly come within the scope of my contribution to the art.

I claim as my invention;

1. A push rod assembly for a power train of an automotive braking system comprising in combination,
    an elongated cylindrical push rod of a first selected diameter and having a portion at one end thereof of a second selected diameter which is a reduced diameter relative to said first selected diameter,
    a push rod button sub-assembly press fit on said reduced diameter portion at said one end of said push rod in firm assembly therewith,
    said button sub-assembly comprising:
        first and second parts consisting of strip stock of less than fifty thousandths inch thickness (0.050") drawn by stamping to form cup-shaped work piece articles having respectively,
        each said cup-shaped work piece article having a bottom wall with an outer circumferentially extending peripheral wall extending longitudinally in one axial direction, and with an inner circumferentially extending peripheral wall of smaller diameter extending coaxially longitudinally in an opposite axial direction,
        said first and said second parts being nested together in interfitting press fit subassembly with one another and being sized and shaped so that said conjoined outer peripheral walls and said bottom walls form a reaction disc recess, and said conjoined inner peripheral walls form a recess for receiving and seating said reduced diameter portion at said one end of said push rod,
    whereby a completed push rod assembly is formed for use in the power train of said automotive braking system.

2. A push rod assembly as defined in claim 1, wherein said outer peripheral walls of said first and said second parts are of such axial longitudinal length dimension that the end edges of the outer peripheral walls are in coplanar registry with one another.

3. A push rod assembly as defined in claim 1, wherein said outer peripheral walls of said first and said second parts are of such axial longitudinal length dimension that the end edge of the outer peripheral wall of one of said parts extends beyond the end edge of the outer peripheral wall of the other of said parts.

4. A push rod assembly as defined in claim 1, one of wherein the outer peripheral walls forming the reaction disc recess is outwardly flared to form a piloting and guiding flange for easing entry of the reaction disc into a reaction disc recess.

5. For use with a push rod, the improvement of a push rod button, said push rod button comprising
    first and second parts each made of metal strip form stock of sufficient thinness to be formed into a drawn shaped and configured work piece by a single stroke stamping operation,
    each of said parts having,
        a bottom wall,
        an outer circumferentially extending circular axially extending wall
        projecting in one axial direction from said bottom wall,
        an inner circumferentially extending circular
        axially extending wall projecting in an opposite
        axial direction from said bottom wall,
    said first and said second parts being sized and configured to interfit with one another in nested layered firm assembly when press fit into firm assembly with one another, and together with one another forming a reaction disc recess on one side of the bottom walls, and a push rod shaft recess on the other side of the bottom walls, thereby to provide an integrated unitary push rod button of sufficient strength and durability to withstand all operating forces produced in a power train of an automotive braking mechanism.

6. A push rod button as defined in claim 5, wherein said outer walls are sized to place the end edges of the outer walls in coinciding planar registry with one another.

7. A push rod button as defined in claim 5, wherein said outer walls are sized to place the outer wall of said first part of shorter longitudinal length than the outer wall of said second part so that the end edge of said first outer wall part is disposed at an intermediate portion of the outer wall of said second part.

8. A push rod button as defined in claim 5, wherein one of said outer walls has a piloting guide flange formed at its end edge to assist in guiding insertion of a reaction disc into the reaction disc recess.

9. A push rod button as defined in claim 5, wherein the metal strip form is metal of less than fifty thousandths inch (0.050")thickness.

10. The method of making a push rod button which comprises the steps of:
    (1) stamping a strip form metallic stock to form and shape a first work piece into a cup shaped configuration displaying a bottom wall with an outer circumferentially extending wall extending axially in one direction from said bottom wall and an inner circumferentially extending wall extending axially in an opposite direction from said bottom wall, (2) stamping a strip form metallic stock to form and shape a second work piece into a complementary shaped configuration to said first work piece so that the two work pieces may be assembled into a nested interfitted unitary whole, and, (3) press fitting said first and second work pieces together into firm assembly with one another, thereby to form a unitary integrated single piece push rod button, adapted to be assembled on an end of a push rod in a power train of an automotive braking assembly.

* * * * *

UNITED STATES PATENT AND TRADEMARK OFFICE
CERTIFICATE OF CORRECTION

PATENT NO. : 5,469,761
DATED : November 28, 1995
INVENTOR(S) : Charles E. Laue

It is certified that error appears in the above-indentified patent and that said Letters Patent is hereby corrected as shown below:

Column 2, line 47, a complete line after "vehicle" is missing. It should read: (not shown) and the master cylinder of the brake actuating mechanism.

Column 3, line 17 after "invention." the beginning of the next sentence is missing and should begin with a new paragraph. --I have discovered that one particularly effective mass production machine which can....-.

Column 4,
    line 27 after "with" add --one--.
    line 36 "pads" should be --parts--.

Signed and Sealed this

Twenty-eighth Day of May, 1996

*Attest:*

BRUCE LEHMAN

*Attesting Officer*     *Commissioner of Patents and Trademarks*